United States Patent [19]
Marchesi et al.

[11] Patent Number: 5,613,452
[45] Date of Patent: Mar. 25, 1997

[54] METHOD AND APPARATUS FOR SOIL REMEDIATION WITH SUPERHEATED STEAM THERMAL DESORPTION AND RECYCLE

[75] Inventors: Primo Marchesi, Lock Haven; George M. Goyak, Murrysville, both of Pa.

[73] Assignee: American Color and Chemical Corporation, Lock Haven, Pa.

[21] Appl. No.: 419,292

[22] Filed: Mar. 30, 1995

Related U.S. Application Data

[63] Continuation of Ser. No. 55,433, Apr. 29, 1993, abandoned.

[51] Int. Cl.$^6$ ............................... F23J 15/00; B09B 3/00
[52] U.S. Cl. ......................... 110/215; 110/236; 110/346; 110/348
[58] Field of Search ...................... 110/215, 216, 110/246, 346, 348, 236, 204; 34/92, 15, 79

[56] References Cited

U.S. PATENT DOCUMENTS

| | | | |
|---|---|---|---|
| 3,212,197 | 10/1965 | Crawford | 34/10 |
| 3,525,673 | 8/1970 | Cameron | 201/1 |
| 3,991,481 | 11/1976 | Coraor et al. | 34/28 |
| 4,217,222 | 8/1980 | Harendza-Harinxma | 210/177 |
| 4,676,908 | 6/1987 | Ciepiela et al. | 210/638 |
| 4,738,206 | 4/1988 | Noland | 110/346 |
| 4,974,528 | 12/1990 | Barcell | 110/240 |
| 5,052,313 | 10/1991 | Walker | 110/346 |
| 5,072,674 | 12/1991 | Noland et al. | 110/346 |
| 5,103,578 | 4/1992 | Rickard | 34/92 |
| 5,121,699 | 6/1992 | Frank | 110/246 |
| 5,142,998 | 9/1992 | Feitel | 110/215 |
| 5,152,233 | 10/1992 | Spisak | 110/240 |
| 5,187,131 | 2/1993 | Tiggelbeck et al. | 502/34 |
| 5,188,041 | 2/1993 | Noland et al. | 110/346 |
| 5,199,354 | 4/1993 | Wood | 110/346 |
| 5,228,803 | 7/1993 | Crosby et al. | 110/346 |
| 5,245,113 | 9/1993 | Schulz | 110/346 |
| 5,272,833 | 12/1993 | Prill et al. | 110/341 |

OTHER PUBLICATIONS

"In Situ Steam/Hot–Air Soil Stripping", Toxic Waste (USA) Inc., EPA Site Technology Evaluation Demonstration Bulletin, EPA/540/M5–90/003, Feb., 1990.

"Batch Steam Distillation and Metal Extraction" It Corporation, EPA Site Technology Profile, pp. 224–225, Nov. 1991; EPA Vendor Information System for Innovative Treatment Technologies (Visitt), pp. 1–22, Sep. 27, 1991.

"Thermal Desorption by Steam Stripping/Solid Waste Desorption", Texarome Inc. EPA Site Technology Profile, pp. 152–153, Nov. 1991; EPA Visitt, pp. 1–14 Aug. 19, 1991; and Related Excerpt, pp. 1–3.

"Here's How it Works" Clean Soil Steam Remediation Technology, Soils p. 42, May 1992.

*Primary Examiner*—Henry A. Bennett
*Assistant Examiner*—Susanne C. Tinker
*Attorney, Agent, or Firm*—Ernestine C. Bartlett

[57] ABSTRACT

A method and apparatus are provided for remediating contaminated soil having volatilizable organic pollutants in a heated treatment zone, preferably a rotary drum, in gas/solids contact with superheated steam. Treatment gases from the treatment zone are repressurized and reheated for reuse in the treatment zone. Superheated steam is maintained in a closed loop and is maintained at superheated conditions. Vaporized organic pollutants and superheated steam are removed from the closed loop of superheated steam for cooling and condensation to condense water and condense liquid volatilizable organic pollutants and uncondensed organic pollutant vapors.

23 Claims, 1 Drawing Sheet

METHOD AND APPARATUS FOR SOIL REMEDIATION WITH SUPERHEATED STEAM THERMAL DESORPTION AND RECYCLE

This is a continuation of application Ser. No. 08/055,433, filed Apr. 29, 1993, abandoned.

FIELD OF THE INVENTION

This invention relates to a method and apparatus for the remediation of contaminated soil by removing volatilizable organic pollutants which contaminate the soil to permit reuse of the soil and recovery of volatilizable organic pollutants. More particularly, the invention relates to a method and apparatus for recovering volatilizable organic pollutants from contaminated soil by means of treatment with superheated steam maintained in a closed, circulating loop.

BACKGROUND OF THE INVENTION

Soil remediation is well established as a procedure for complying with environmental clean-up requirements. Continued accumulations of volatilizable organic pollutants in the soil around chemical plants, petroleum plants, manufacturing plants, gasoline filling stations, and agricultural chemical deposits (e.g., pesticides, herbicides, fungicides, etc.) may be considered as a threat to surface water and ground water or a threat to one or more other circumstance which is regulated by environmental laws and rules. Where contaminated soil is objectionable, there are numerous regulations to be considered.

The present invention is concerned with contaminated soil remediation where the volatilizable organic content of the soil exceeds the allowable regulatory maxima but is preferably less than about five weight percent of the soil and more particularly less than about two weight percent of the soil. Examples of suitable soils include solids such as topsoil, river sediments, bedrock, alluvium, and particulate fill materials such as cinders, gravel and slag.

Several procedures for remediating contaminated soils are shown in U.S. Pat. Nos. 4,738,206; 4,974,528; 5,072,674; 5,103,578; 5,121,699; 5,142,998; 5,152,233; 5,187,131; (heat supply for devolatilization by heated flight conveyor) U.S. Pat. Nos. 4,738,206; 5,072,674; 5,142,998; (indirect heating means, e.g. electric heaters or heat exchange fluids) U.S. Pat. No. 5,103,578; and (fuel oil or fuel gas combustion) U.S. Pat. Nos. 4,974,528; 5,121,699; 5,152,233.

None of the prior art processes employ superheated steam in gas/solids contact with the contaminated soil in a system wherein superheated steam and the volatilized and/or volatilizable organic pollutants recirculate with the system at temperatures which maintain the superheated system in a superheated state, i.e., wherein the steam is maintained above its saturation temperature at all times.

SUMMARY OF THE INVENTION

According to the present invention, contaminated earth solids are introduced into an enclosed treatment zone, preferably an appropriately sealed rotating drum, which is maintained at an elevated temperature which promotes volatilization of any volatilizable organic pollutants from the contaminated soil. Appropriate soil temperatures are 250° F. to 1000° F. and preferably 300° F. to 700° F. depending on the particular pollutants present in the soil and the particular contaminated soil. The contaminated soil is introduced into the treatment zone at ambient temperature and is heated within the treatment zone to a pre-selected discharge temperature after which a remediated soil having a residual organic pollutant content acceptable within applicable laws and regulations is obtained.

The soil preferably is heated to a pre-selected temperature and maintained at the pre-selected temperature within the rotary drum for a residence time sufficient to achieve the desired pollutant volatilization. Extended residence time with extended retention of the contaminated soil in the treatment zone may achieve the desired pollutant volatilization at a lower soil temperature. The pre-selected temperature and pre-selected residence time will be determined by the specific contaminated soil, the nature of the organic pollutants and the maximum residual contamination under applicable regulations or other considerations.

A stream of treatment gas passes through the treatment zone in gas/solids contact with the contaminated soil. The treatment gas consists of superheated steam and volatilized organic pollutants which have been removed from contaminated soils in the prior operation of the process. The treatment gas is withdrawn from the treatment zone at an exit pressure and at an exit temperature which is sufficient to maintain the steam in a superheated state. A major portion of the treatment gas is pressurized, reheated and returned to the treatment zone as the treatment gas. A portion of the exit gas, consisting of superheated steam and volatilized, volatilizable organic pollutants, is separated from the recirculating treatment gas and is cooled to condense the superheated steam and most of the vaporized organic pollutants. Any non-condensed organic pollutants are recovered as a gas stream; the condensed organic pollutants are recovered as a liquid stream; the condensed superheated steam is recovered as water.

The hot decontaminated soil is recovered from the treatment zone and is recycled to the environment. In a preferred mode, the decontaminated soil is restored to the location from whence it originated, i.e., the plot of land requiring remediation. Alternatively the decontaminated soil may be dispersed in other areas, for example, the decontaminated soil may qualify as a cover for municipal landfills. The water recovered from the process may be used to cool and moisten the decontaminated soil prior to reuse of the decontaminated soil.

In one embodiment, the exit gas from the treatment zone may be passed through a gas/solids separator such as a cyclone, a baghouse, an impingement knock-out box, etc. to remove gas-borne particles which may be objectionable in the subsequent gas treatment. Preferably such a gas/solids separator will be heated to a temperature above the temperature of the gas stream passing through the gas/solids separator to preclude deposition of volatile organic materials from the gas stream. Solids recovered from the gas/solids separator can be returned to the treatment zone or can be separately disposed of in any suitable or desirable procedure, e.g., appropriate landfilling.

The present invention and apparatus permit relatively easy separation of the recovered volatilized organic pollutants from the condensed superheated steam. Depending upon the nature of the contaminating organic pollutants, appropriate recovery for recycle may be feasible as in the case of, for example, recovered benzene, toluene, xylene; aliphatic and cyclic petroleum products, etc.

BRIEF DESCRIPTION OF THE DRAWING

The sole FIGURE.

DETAILED DESCRIPTION OF THE PREFERRED EMBODIMENTS

Figure 1:
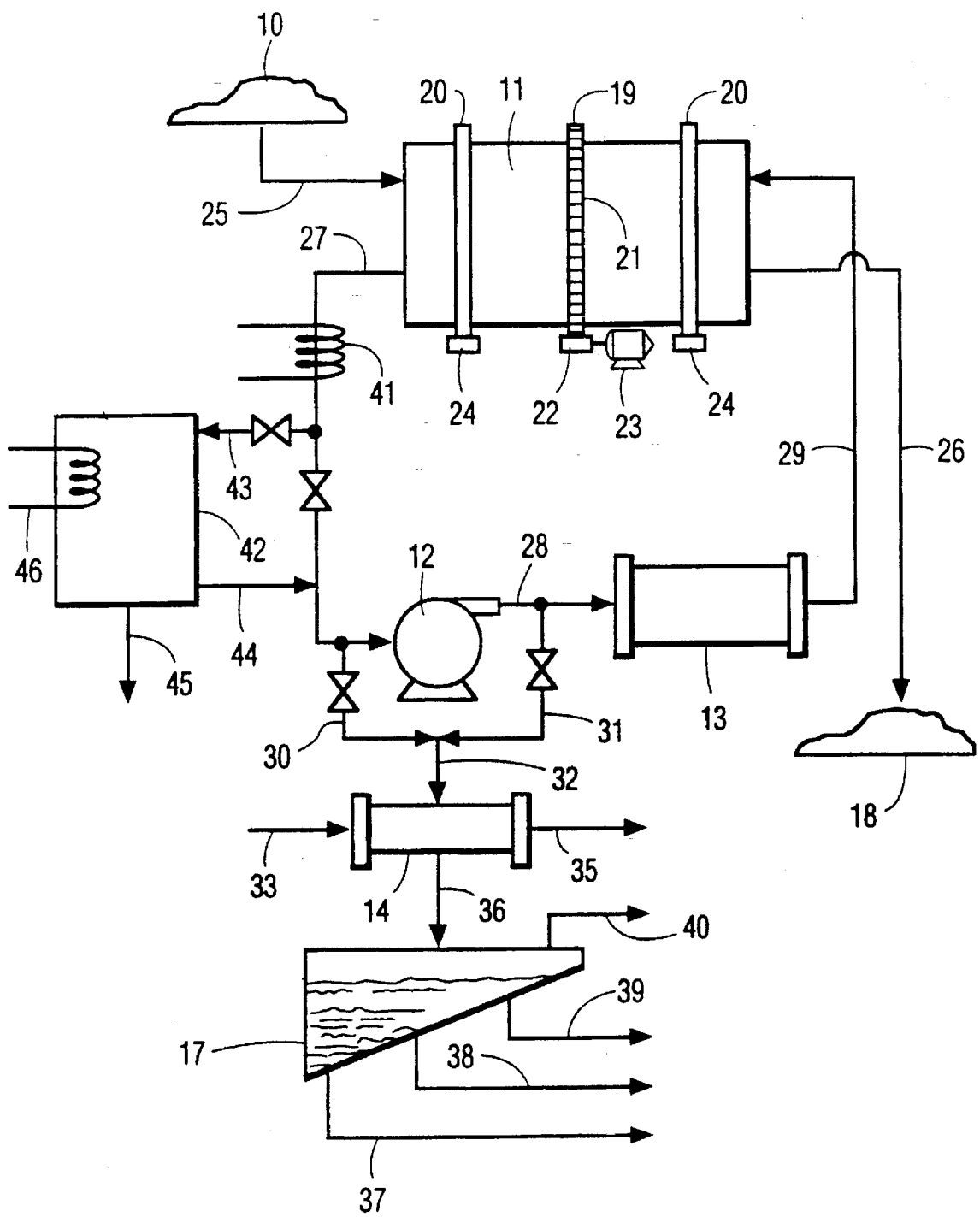
FIG. 1, is a schematic illustration of the apparatus assembled according to the invention for carrying out the novel methods.

Examples of contaminated soil that may be used for the purposes of this invention include earth materials (e.g., topsoil, river sediments, bedrock, alluvium) or particulate fill material (e.g., cinders, gravel, slag) and others which contain objectionable quantities of volatilizable organic pollutants, i.e., quantities exceeding the limits imposed by environmental laws and regulations. Preferably, organic pollutant content should not exceed about 5% by weight of the earth solids and most preferably should not exceed about 2% by weight of the earth solids in order to benefit from the present invention although soils with higher pollutant content may be satisfactorily treated.

Volatilizable organic materials are those organic materials which can enter into the vapor phase at the temperatures anticipated in the treatment zone. The volatilizable organic pollutants thus include:

normally volatile materials which may be dissolved or absorbed in the soil (e.g., acetone, paint thinners, etc.);

normally liquid organic materials which may be absorbed or otherwise contained in the soil (e.g., benzene, toluene, xylene, gasoline, fuel oil, lubricating oil, etc.);

materials which may be solid or semi-solid at ambient temperature but which can be volatilized at elevated temperatures (e.g., heavy oil, grease, light asphalt, tars, etc.);

agricultural chemicals such as pesticides, herbicides, rodenticides, fertilizers, etc.; and halogenated organic materials such as halogenated aromatics (PCBs) and halogenated aliphatics, etc.

For convenience, the volatilizable organic materials are sometimes referred to herein as "pollutants" to indicate that they are not naturally occurring ingredients of the soil.

Superheated steam is steam which is maintained at a temperature above its saturation temperature with liquid water. Superheated steam can exist at sub-atmospheric pressure, at atmospheric pressure and at super-atmospheric pressures. Superheated steam at all times contains the latent heat of vaporization and at least some sensible heat or enthalpy.

Referring to FIG. 1, the principal elements of the apparatus are:

10 a supply site for contaminated earth solids;

11 a rotary drum which is a treatment zone for gas/solids contact;

12 pump or blower means for increasing the pressure of recirculating treatment gas;

13 a steam superheater for increasing the temperature of recirculating treatment gas;

14 a condenser for recondensing a portion of the recirculating treatment gas;

17 a liquid collector shown as a decanter for separate recovery of non-condensed organic gases, condensed organic liquids and water; and 18 a collection site for decontaminated soil.

The Treatment Zone

The treatment zone preferably is a rotary drum. Typically rotary drums have circumferential supporting bands 20 (two are shown) which support the drum in a position with the central lengthwise axis tilted from the horizontal to facilitate movement of solids through the rotary drum. Another band 19 may be provided with perimeter teeth 21 which engage a toothed gear driving gear 22 driven by an appropriate drive means 23, usually a motor and speed reducer, to turn the rotary drum about its central lengthwise axis. The other bands 20 are supported on trunnion rolls 24 and thrust rolls (not shown). The rotary drum 11 rotates in accordance with the manufacturer's specification for the desired solids throughput. The rotary drum customarily is equipped with agitating flights extended radially inwardly from the inner cylindrical wall of the drum. The flights may have angled surfaces to facilitate lifting and showering of earth solids as they move through the rotary drum from left to right in FIG. 1. The rotary drum 11 is a sealed drum which has appropriate feeding means for receiving contaminated soil from the supply site 10 through a conduit 25. An auger feeder is a preferred feeding means for introducing contaminated soil into the rotary drum 11. Double-valved lock-hoppers or star valves may be used. Appropriate means may be provided for metering the flow of contaminated soil. The rotary drum 11 also has sealed withdrawal means for removing decontaminated soil from the rotary drum 11 through a conduit 26 to the collection site 18 for decontaminated soil. The withdrawal means preferably is a double-valved lock-hopper or star valve.

The rotary drum 11 can be any of several that may be obtained from several manufacturers. One embodiment is a steel cylinder having thermal insulation around the outer cylindrical wall and having inwardly directed radial flights to agitate and advance the soil moving through the drum.

In the preferred embodiment of the invention, all of the heat requirements for the process are supplied by the sensible heat of the recirculating superheated steam. In other embodiments, the superheated steam may supply a portion of the heat requirements for the process, with another portion of the heat requirements being supplied by means of a heated rotary drum 11 which may be a heated concentric rotary drum having two concentric steel cylinders in which heating gases are burned in the annulus between the two cylinders and the contaminated soil is delivered into the central cylinder. Alternatively, the rotary drum may be heated electrically, etc.

The rotary drums as described are readily available. The length and diameter of a rotary drum determines the internal volume and hence the throughput of the drum. A typical drum might be 5 feet in diameter and 30 feet long for processing 1 to 5 tons per hour of contaminated soil. The drum may range from about 3 feet to about 8 feet in diameter and have a length from 10 to 40 feet. In general, about 10% of the volume of a rotary drum comprises the solid materials undergoing treatment within the drum.

The rotary drum usually will exhibit a temperature profile with the highest temperature adjacent to the solids discharge end of the drum and the lowest temperature adjacent to the solids inlet of the drum.

The Treatment Gas

The treatment gas consists of superheated steam and volatilized organic pollutants which have been removed from previously treated contaminated soil in the process. The treatment gas passes through a closed loop consisting of:

the rotary drum 11; a conduit means 27 which leads from the rotary drum 11 to the blower means 12; a conduit means 28 which leads to the steam superheater 13; and a conduit means 29 which leads back to the rotary drum 11.

Treatment gas enters into the rotary drum 11 through the conduit means 29 at an elevated temperature, i.e., elevated above the operating temperature within the rotary drum 11. The hot treatment gas provides the heat of vaporization for the volatilizable organic pollutants in the contaminated soil. The treatment gas also provides at least some of the heat necessary for the heat of vaporization of the moisture which is inherent in the contaminated soil. Thus the treatment gas generates additional superheated steam from the soil moisture. The treatment gas, the newly created superheated steam and the volatilized, volatilizable organic pollutants exit from the rotary drum 11 at an exit temperature and an exit pressure and is delivered through conduit means 27 to the pump (blower) means 12 where the pressure of the gases is increased above the exit pressure. The exit pressure can be sub-atmospheric, atmospheric or super-atmospheric. Typically the exit pressure is from 0 to 5 psig. The exit temperature is sufficient to maintain the superheated steam in a superheated state at the exit pressure, and typically is 220° F. to 500° F. The blower means 12 increases the treatment gas pressure sufficiently to drive the treatment gas through the superheater 13 and the rotary drum 11. Typically the blower/pump means 12 raises the treatment gas pressure to 2 to 15 psig, i.e., several psig above the exit pressure. Relatively low pressures are preferred to avoid any pressure-vessel piping requirements, i.e., the need to design, build, test and maintain the system in accordance with industry codes for pressure-vessels. Centrifugal compressors or positive displacement blowers are preferred as the pump means. Optionally, the process may be operated under subatmospheric pressure, e.g., at 14.7 to 13.8 psia. Subatmospheric pressure operation reduces any tendency of the system to leak organic pollutants into the environment. If such subatmospheric operation is employed, then the inner portion of the exit gas stream will pass the pump means 12 and conduits 28, 31, 32 to the condenser 14; the conduit 30 will be closed. During subatmospheric operation, the system must remain relatively free of leaks which might allow air to enter the recirculating superheated steam loop.

The Steam Superheater

The steam superheater 13 is a heat transfer device such as an electrical core heater or a gas or fuel oil fired heater. Electrical heating is preferred for precise control of the process.

The pressurized treatment gases are delivered from the pump means 12 through the conduit 28 to the steam superheater where the temperature of the treatment gases is increased above the exit temperature. Typically the temperature of the treatment gases entering the conduit 29 from the steam superheater 13 will be 500° F. to 1100° F. A product stream is withdrawn from the treatment gas loop through conduits 30 or 31.

It should be observed from the preferred embodiment illustrated in FIG. 1 that the volume of the rotary drum 11 greatly exceeds the total volume of the conduit means 27, 28, 29 and the pump means 12 and superheater 13. Thus in any instant, the overwhelming majority of the treatment gas is in the rotary drum 11 and a minor portion of the recirculating treatment gas is in the remainder of the closed loop consisting of the conduit means 27, 28, 29, the pump means 12, and the superheater 13.

The Organic Pollutant Collection System

A portion of the recirculating treatment gas from the conduit 27 or from the conduit 28 is recovered through conduits 30, 31 respectively and delivered through a conduit 32 to the condenser 14. The material passing into the condenser 14 corresponds to the moisture and organic pollutant content of the contaminated soil. The condenser is cooled by means of coolant fluids which are delivered through a conduit 33, and withdrawn through a conduit 35.

If adequate cooling water is available, cool water will enter conduit 33 and heated water will be withdrawn through conduit 35. If cooling water is not available, a chiller (not shown) may provide chilled coolant fluid through conduit 33. Heated coolant fluid is withdrawn through conduit 35 and recovered for reuse as coolant.

Substantially all of the superheater steam is cooled and condensed in the condenser 14 along with substantially all of the condensible volatilized organic pollutants. The liquid products from the condenser 14 are delivered through a conduit 36 to the collector 17 which is shown as a decanter. Uncondensed organic pollutants are removed from the decanter 17 through conduit means 40. Light organic pollutants are removed from the decanter 17 through conduit means 39. Water is removed from the decanter 17 through conduit means 38. Heavy tars, asphalts, carry-over particles, etc., are withdrawn from the decanter 17 through conduit means 37.

The mass flow rate of treatment gas through the conduit means 29 is from 2.5 to 100 times (preferably 5 to 30 times) the mass flow rate of treatment gas recovered through the conduits 30 or 31. The need for substantial volumes of flow arises from the use of the superheated steam in the treatment gas as a source of heat for vaporization of volatilizable organic pollutants and for vaporizing moisture from the contaminated soil within the rotary drum 11. In some embodiments it may be desirable to provide extrinsic heat to the exit gas stream in the conduit means 27 as shown schematically by the heater element 41. The supplemental heat is primarily intended to preclude condensation of volatilized organic pollutants within the conduit 27 and the pump means 12 and the conduits 28, 30, 31 and 32.

Solids Removal

It may be desirable to remove gas-borne solid particles from the recirculating treatment gas in the conduit 27. An appropriate solids/gas separator 42 may be provided along with conduit means 43 for receiving treatment gas from the conduit 27 and conduit means 44 to return to the conduit 27 treatment gas from which solids have been removed. The particles from the conduit 45 may be returned to the rotary drum 11 or may be otherwise managed. It is desirable that the solids/gas separator 42 be maintained at a temperature above the condensation temperature of the volatilized organic pollutants. Appropriate heating means indicated schematically by the numeral 46, are provided to maintain the solids/gas separator 42 at an appropriate elevated temperature.

EXAMPLES

To illustrate the cost effectiveness of the present invention, four examples are provided for comparison in which the energy requirements for decontamination of soils by treatment with superheated steam is calculated for a process according to the invention, in which superheated steam is recycled, and according to a process in which superheated steam is employed without recycling. In all instances, the calculations are based on the following: (a) the contaminated soil contains 1% by weight of volatilizable organic pollutants and 20% by weight moisture at ambient temperature (60° F.); (b) the decontaminated soil contains less than 0.5 wt percent water and less than 0.001 wt percent of residual organic pollutant, i.e., more than 99.9 wt percent of the volatilizable organic pollutants were removed; (c) the rotary drum is 5 feet in diameter, weight 7000 lbs. and the soil is heated to 700° F.

Four examples will highlight the benefits resulting from the practice of the present invention.

In each example, calculations are made based on the system illustrated in FIG. 1 with certain changes to be described.

In EXAMPLE III, the calculations were based on a system similar to that described in EXAMPLE II except that the throughput is 2 tons per hour.

In comparative EXAMPLE IV, the calculations were based on a system wherein the rotary drum 11 and the recovery system illustrated in FIG. 1 were employed, without pump 12, i.e. a system which has no recirculating superheated steam and in which superheated steam provides all of the heat energy, is employed on a once-through basis, and the throughput is 1 ton per hour.

TABLE I sets forth the parameters of each EXAMPLE and the heat requirements and steam requirements.

TABLE I

ENERGY REQUIREMENTS FOR SOIL DECONTAMINATION

| | EXAMPLES | | | |
|---|---|---|---|---|
| | I | II | III | IV |
| FEED SOIL | | | | (comparative) |
| Water, wt %* | 20 | 20 | 20 | 20 |
| Organics, wt %* | 1 | 1 | 1 | 1 |
| Temperature (°F.) | 60 | 60 | 60 | 60 |
| FLOW RATE lbs/hr | 2000 | 2000 | 4000 | 2000 |
| PRODUCT SOIL | | | | |
| Water, wt %** | <0.5 | <0.5 | <0.5 | <0.5 |
| Organics, wt %** | <0.001 | <0.001 | <0.001 | <0.001 |
| Exit Temperature (°F.) | 700 | 700 | 700 | 700 |
| HEAT REQUIREMENTS (75%; Efficiency), MBTU/hr | | | | |
| Heat Soil to 700 (°F.) | 520 | 520 | 1040 | 520 |
| Heat, Vaporize Moisture | 665 | 665 | 1330 | 665 |
| Heat, Vaporize Organics | 15 | 15 | 30 | 15 |
| Heat Loss | 300 | 300 | 300 | 300 |
| TOTAL HEAT REQUIREMENTS | 1500 | 1500 | 2700 | 1500 |
| STEAM REQUIREMENTS | | | | |
| S/H Steam lbs/hr | 3925 | 2250 | 2250 | 3925 |
| S/H Steam to Compressor 220 (°F.) - ACFM | 1770 | 1015 | 1015 | N/A |
| S/H Steam to Superheater 300 (°F.) - ACFM | 1310 | 750 | 750 | N/A |
| S/H Steam to Rotary Drum 1000 (°F.) - ACFM | 2820 | 1600 | 1600 | 3925 |
| INDIRECT HEAT - MBTU/hr | 0 | 635 | 1835 | 0 |

*Wet Basis
**Dry Basis

EXAMPLES I, II and III illustrate the cost effectiveness of the invention. EXAMPLE IV is a comparative example and illustrates the cost of using superheated steam in a process without recycle or recirculation of superheated steam.

In EXAMPLE I, calculations were based on the system illustrated in FIG. 1 operated on 1 ton per hour of contaminated soil with superheated steam being employed to supply the entire heat requirements of the system.

In EXAMPLE II, calculations were based on the system illustrated in FIG. 1 operated on 1 ton per hour of contaminated soil with indirect heat supplied to the rotary drum and superheated steam employed to heat the soil and to maintain the contaminated soil at the desired temperature, 700° F., and to offset heat losses from the system to the environment.

From TABLE I it will be observed that the steam requirement for EXAMPLE I is the same as that for EXAMPLE IV. In both EXAMPLES I and IV all of the heat requirement is supplied by superheated steam. Similarly, the superheated steam requirement for EXAMPLE II is the same as that of EXAMPLE III, despite the fact that EXAMPLE III treats twice the quantity of contaminated soil of EXAMPLE II.

TABLE II sets forth the cooling requirements for volatilized organic pollutants and the carrying steam and also a summary of the overall energy requirements.

TABLE II

ENERGY REQUIREMENTS FOR ORGANIC RECOVERY

| | EXAMPLES | | | |
|---|---|---|---|---|
| | I | II | III | IV |
| GAS EXIT STREAM (lbs/hr) | | | | (comparative) |
| Steam | 3925 | 2250 | 2250 | 3925 |
| Soil Moisture | 390 | 390 | 780 | 390 |
| Organics | 20 | 20 | 40 | 20 |
| GAS STREAM TO CONDENSER (lbs/hr) | | | | |
| Vaporized Moisture | >390 | >390 | >780 | >390 |
| Organics | 20 | 20 | 40 | 20 |
| Recirculating S/H Steam | 0 | 0 | 0 | 3925 |
| TOTAL LBS/HR TO CONDENSER | >410 | >410 | >820 | >4335 |
| COOLING REQUIREMENTS | | | | |
| to 60 (°F.), 75% Efficiency MBTU/hr | 617 | 617 | 1234 | 5000 |
| ENERGY REQUIREMENTS (MBTU/ton) | | | | |
| S/H Steam | 1500 | 865 | 433 | 5300 |
| Cooling | 620 | 620 | 620 | 5120 |
| Indirect Heat To Rotary Drum | 0 | 635 | 917 | 0 |
| TOTAL ENERGY REQUIREMENTS MBTU/Ton | 2120 | 2120 | 1970 | 10420 |

In TABLE II the cooling requirements per ton of soil processed are identical for EXAMPLE I, EXAMPLE II and EXAMPLE III.

The cooling requirements for EXAMPLE IV are disproportionate because the superheated steam is employed on a once-through basis.

Summary of Examples I to IV

From TABLE II it will be observed that substantial savings in the total energy requirements per ton for the described soil decontamination are obtained according to the invention (compare Examples I, II and III with example IV). It will also be observed that the total energy requirements per ton are least for EXAMPLE III since the same rotary drum is processing twice the throughput with the same heat loss. The energy requirements for the method illustrated by EXAMPLE IV (without recirculation or recycle of superheated steam) are excessive.

Some of the energy supplied for EXAMPLES II and III is in the form of burning fuel gas or fuel oil which indirectly heat the rotary drum and provides thermal energy at relatively low cost and at a significantly lower cost than electrically heated superheated steam. It is thus possible to reduce the amount of superheated steam required to be in the recirculating loop (compare EXAMPLES II, III versus EXAMPLES I, IV) and to thus reduce the size of the superheater 13 and pump 12 by the use of supplemental heating means.

The process of the invention has been used on a bench scale and found to be effective for decontamination of contaminated soil from a variety of contaminated sites including a former wood treating facility that used creosote and copper, chromium and arsenic formulations and a site contaminated with pesticides.

The method and system of the invention have been found to be quite flexible with a wide variety of operating temperatures and residence times depending on the material being treated, are applicable to the cleanup of a variety of contaminants, and are a viable alternative for on-site treatment of soils from various contaminated sites.

The method and system may be used in conjunction with the remediation of contaminated solid materials as described and claimed in copending U.S. applications Ser. No. 055,428 entitled METHOD FOR TREATMENT OF CONTAMINATED MATERIALS WITH SUPERHEATED STEAM THERMAL DESORPTION AND RECYCLE and U.S. Ser. No. 055,432, entitled METHOD FOR TREATMENT OF IMPOUNDED SLUDGES, SOILS AND OTHER CONTAMINATED SOLID MATERIALS, both filed concurrently and commonly assigned herewith, the disclosures of which are incorporated herein by this reference.

We claim:

1. A method for reducing the volatilizable organic pollutant content of soil which is contaminated with at least one volatilizable organic pollutant, comprising:

delivering contaminated soil to a treatment zone and passing said contaminated soil through said treatment zone in vapor/solids contact with treatment vapors consisting essentially of predominantly superheated steam and devolatilized organic pollutant whereby moisture from said contaminated soil is converted to steam and a substantial portion of said volatile organic pollutant is volatilized;

maintaining said treatment zone at a pre-selected temperature to cause moisture from said soil to convert to steam and a substantial portion of said organic pollutants to volatilize, recovering from said treatment zone a relatively dried soil having substantially lower pollutant content than said contaminated soil;

recovering as an exit gas stream at an exit temperature and an exit pressure the treatment vapors from said treatment zone, said exit gas stream comprising predominantly superheated steam and a minor portion of volatilized organic pollutants; and recirculating a major portion of said recovered exit gas steam at a pressure and temperature greater than said exit pressure and said exit temperature and consisting essentially of predominantly superheated steam and a minor portion of volatilized organic pollutant to said treatment zone as the treatment vapors therein.

2. The method of claim 1 including the additional step of heating said treatment zone and its contents independently of said superheated steam.

3. The method of claim 1 including the additional steps of recovering a minor portion of said exit stream and cooling said minor portion of said exit gas stream to condense superheated steam and to condense substantially all of the condensible volatilized organic pollutants therein to a liquid state.

4. The method of claim 3 wherein the mass flow ratio of said exit gas stream to the mass flow of said minor portion of said exit gas stream exceeds between 5:1 to 30:1.

5. The method of claim 1 wherein said exit pressure is less than 10 psig.

6. The method of claim 1 wherein said exit pressure is less than one atmosphere.

7. The method of claim 1 wherein said exit gas stream contains gas-borne particles and said exit gas stream is passed through a solids-gas separator to remove a substantial quantity of said gas-borne particles from said exit gas stream.

8. The method of claim 7 wherein said solid-gas separator is heated to maintain an elevated temperature therein above the temperature of gas and solids in said separator.

9. The method of claim 1 wherein said treatment zone is a rotary drum.

10. The method of claim 9 wherein the rotary drum is heated to provide a portion of the thermal energy required to heat said contaminated soil and to maintain said rotary drum at a pre-selected temperature profile.

11. A method for reducing the volatilizable organic pollutant content of particulate soil which is contaminated with at least one volatilizable organic pollutant, comprising:

delivering contaminated particulate soil to a treatment zone and passing said contaminated soil through said treatment zone in vapor/solids contact with treatment vapors consisting essentially of predominantly superheated steam whereby moisture from said contaminated particulate soil is converted to steam and a substantial portion of said volatile organic pollutant is volatilized;

heating said treatment zone to maintain a pre-selected temperature therein;

recovering from said treatment zone a dried, particulate soil having substantially lower pollutant content than said contaminated particulate soil;

recovering as an exit gas stream at an exit temperature and an exit pressure the treatment vapors from said treatment zone, said exit gas stream comprising predominantly superheated steam and a minor portion of volatilized organic pollutants;

removing a minor portion of said exit gas stream;

increasing the pressure of the remaining exit gas stream to a pressure greater than said exit pressure and heating the resulting pressurized gas stream to an elevated temperature above said exit temperature;

recirculating the resulting gas stream at a pressure and temperature greater than said exit pressure and said exit temperature and comprising predominantly superheated steam and a minor portion of volatilized organic pollutant to said treatment zone as the treatment vapors therein, whereby said gas stream and said treatment vapors consist essentially of predominantly superheated steam; and cooling said removed minor portion of said exit gas stream to condense superheated steam and to condense substantially all of the condensible volatilized organic pollutants therein to a liquid state.

12. The method of claim 11 including the additional step of heating said treatment zone and its contents independently of said superheated steam.

13. The method of claim 11 wherein the mass flow ratio of said exit gas stream to the mass flow of said minor portion of said exit gas stream exceeds between 5:1 to 30:1.

14. The method of claim 11 wherein said exit pressure is less than 10 psig.

15. The method of claim 11 wherein said exit pressure is less than one atmosphere.

16. The method of claim 11 wherein said exit gas stream contains gas-borne particles and said exit gas stream is passed through a solids-gas separator to remove a substantial quantity of said gas-borne particles from said exit gas stream.

17. The method of claim 11 wherein said treatment zone is a rotary drum.

18. The method of claim 11 wherein the rotary drum is heated to provide at least a major portion of the thermal energy required to heat said contaminated soil and to maintain said rotary drum at a pre-selected temperature profile.

19. Apparatus for treating solid materials which are contaminated with at least one organic pollutant in order to reduce the content of said pollutant, including:

(a) a treatment zone having a treatment chamber, means for introducing contaminated solid materials into said chamber, means for recovering dried particulate solid materials from said chamber having a substantially reduced organic pollutant content, means for introducing treatment vapors consisting essentially of superheated steam into said treatment chamber, means for establishing effective vapor/solids contact in said chamber between said treatment vapors and said solid materials, and means for recovering an exit gas stream from said chamber comprising predominantly superheated steam and a minor portion of vaporized moisture from said solid materials and a minor portion of volatilized organic pollutant;

(b) a gas-pressurizing means; a gas-heating means; first conduit means extending from said chamber means to said gas pressurizing means; second-conduit means extending from said gas-pressurizing means to said gas-heating means; and third conduit means extending from said gas-heating means to said treatment chamber, providing a closed loop for circulation of treatment vapors from said treatment chamber through said first conduit, through said gas-pressurizing means, through said second conduit means, through said gas-heating means, and through said third conduit means to said treatment chamber; and (c) condenser means for cooling a gas stream; fourth conduit means connecting said condenser means and said first conduit means or said second conduit means for delivering a gas stream from said first conduit means or said second conduit means to said condenser means.

20. The apparatus of claim 19 including heating means for heating said treatment chamber independently of said superheated steam.

21. The apparatus of claim 19 wherein said treatment zone is a rotary drum.

22. The apparatus of claim 19 including gas/solids separating means in said first conduit means.

23. The apparatus of claim 22 including heating means for maintaining a pre-selected temperature within said gas solids separating means.

* * * * *